T. H. DODGE.

Combined Reaper and Mower.

No. 26,972.

4 Sheets—Sheet 1.

Patented Jan'y 31, 1860.

T. H. DODGE.

Combined Reaper and Mower.

No. 26,972.

4 Sheets—Sheet 3.

Patented Jan'y 31, 1860.

Witnesses:   Inventor:

T. H. DODGE.
Combined Reaper and Mower.
No. 26,972.
4 Sheets—Sheet 4.
Patented Jan'y 31, 1860.
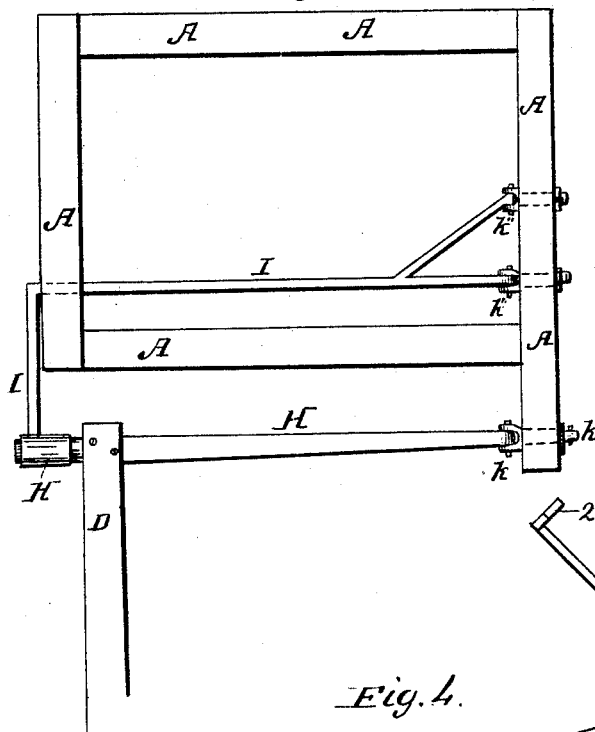
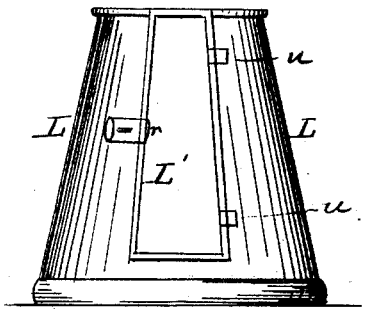
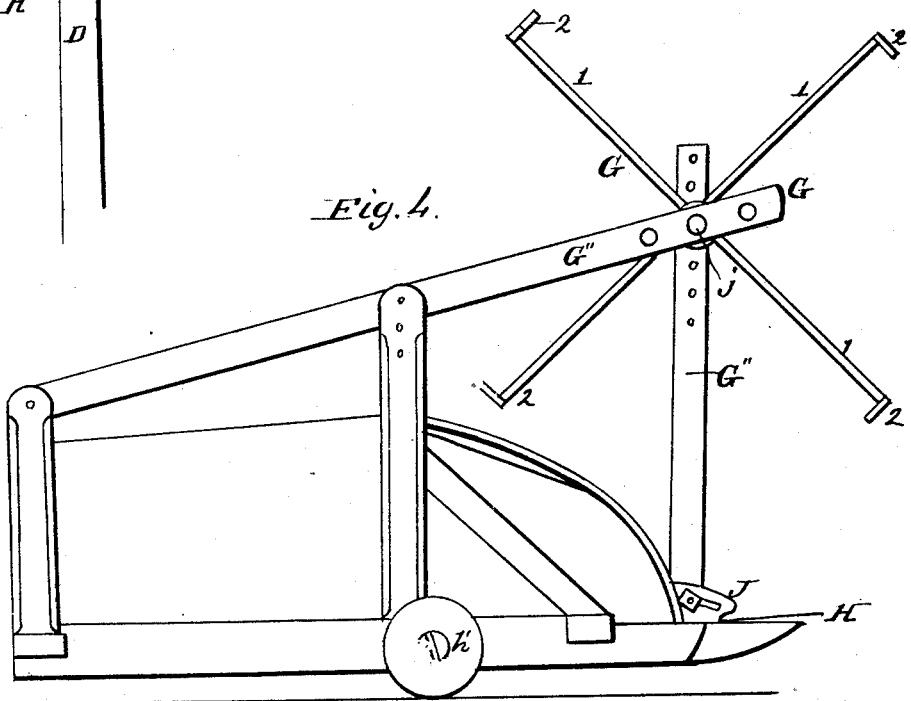

UNITED STATES PATENT OFFICE.

THOMAS H. DODGE, OF WASHINGTON, DISTRICT OF COLUMBIA.

IMPROVEMENT IN COMBINED REAPING AND MOWING MACHINES.

Specification forming part of Letters Patent No. 26,972, dated January 31, 1860.

*To all whom it may concern:*

Be it known that I, THOMAS H. DODGE, of the city and county of Washington, in the District of Columbia, have invented certain new and useful Improvements in Combined Reaping and Mowing Machines; and I do hereby declare that the following is a full, clear, and exact description of the same, reference being had to the accompanying drawings, and to the letters of reference marked thereon, forming a part of this specification, in which—

Figure 1:
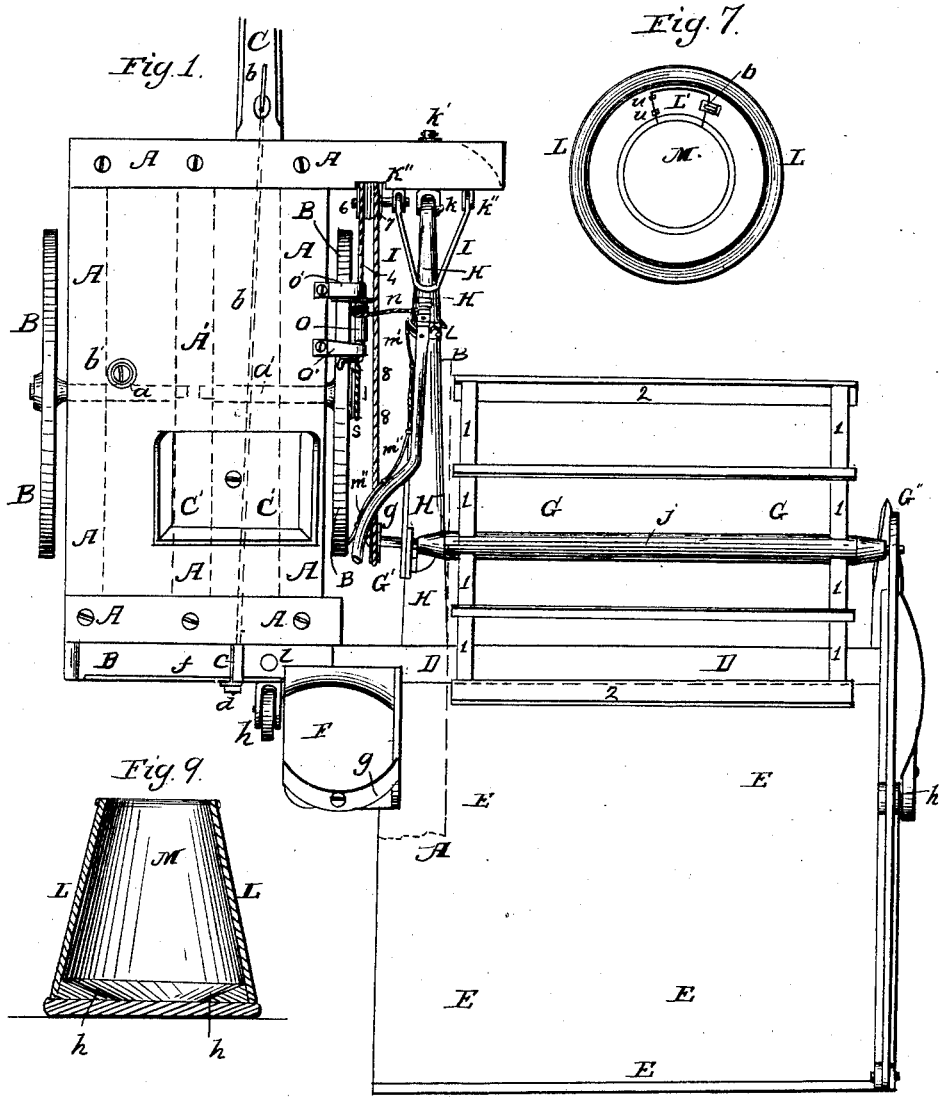
Figure 2:
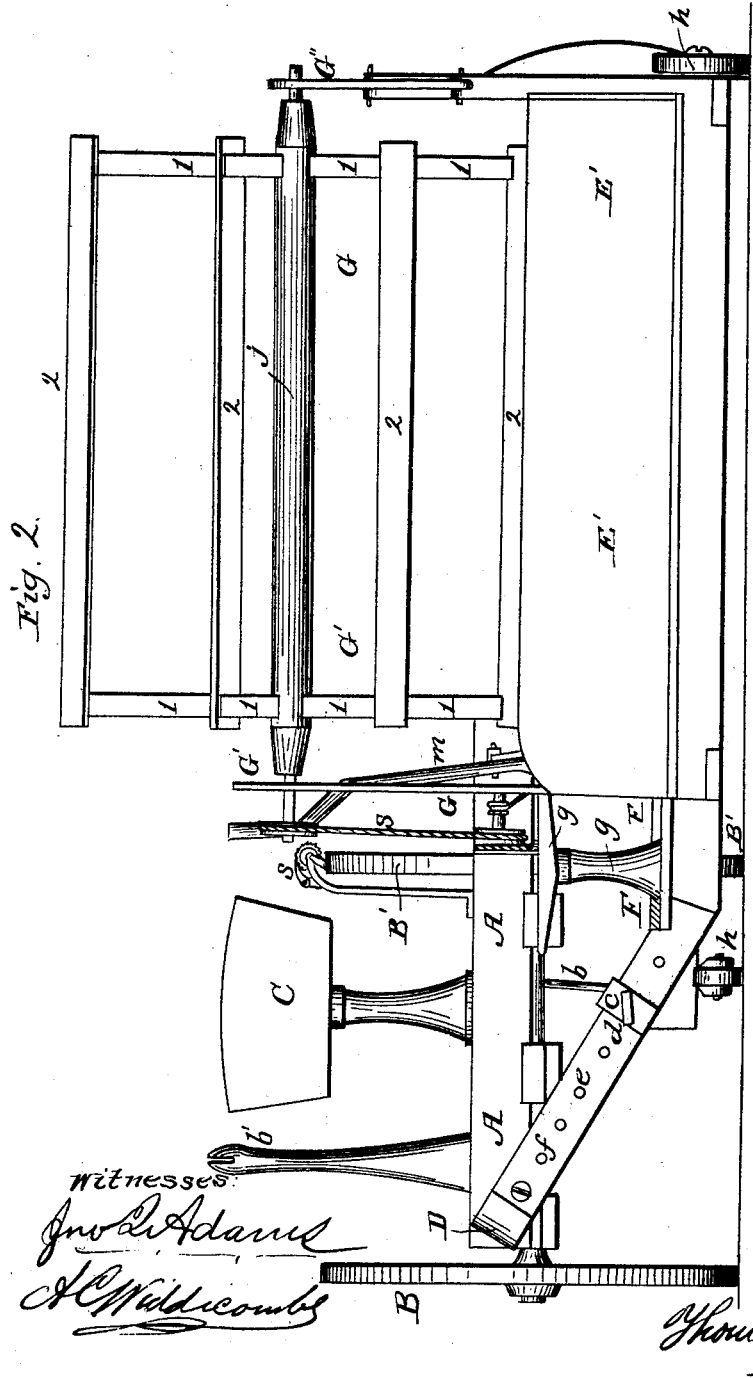
Figure 3:
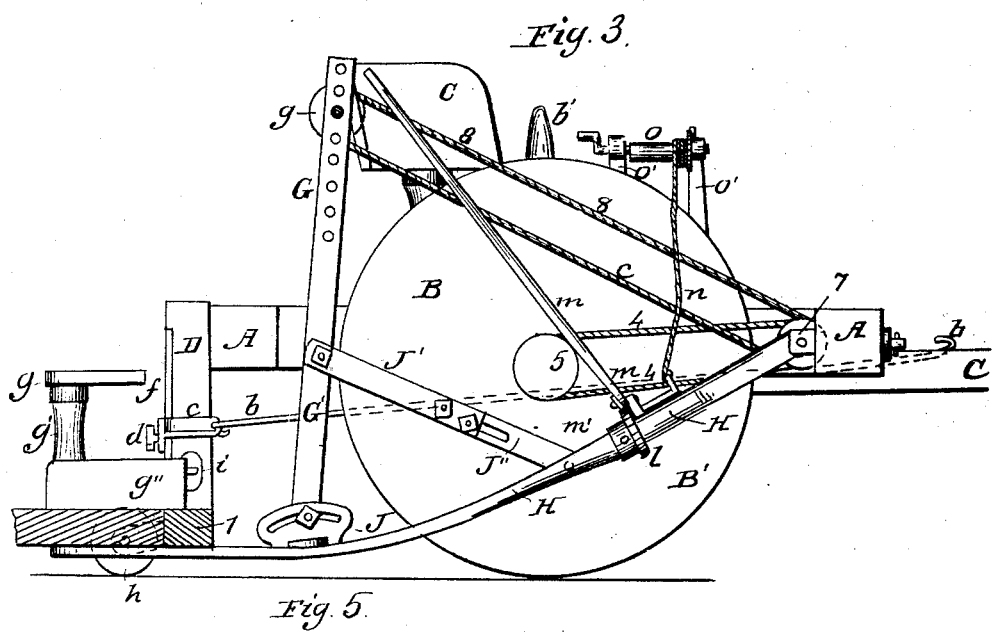
Figures 5, 10, 11:
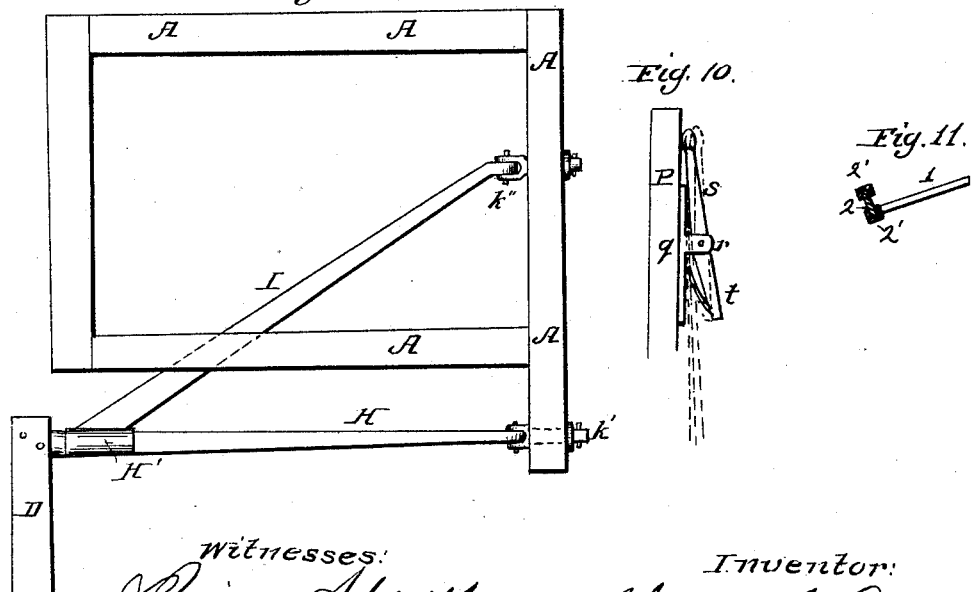

Figure 1 represents a plan or top view of my improved reaper and mower. Fig. 2 represents a rear view of the same. Fig. 3 represents a section on line A B, Fig. 1. Fig. 4 represents a view of the grain end of the platform and reel. Figs. 5 and 6 represent modifications of some of the parts. Figs. 7, 8, and 9 represent views of the raker's box; and Fig. 10 represents a view of a rein-hitch.

A represents a main frame of rectangular form, the front timber projecting grainward, for a purpose hereinafter to be described.

B B' are the supporting-wheels, having separate axles $a$ $a'$, with their inner ends resting in bearings or journals in the timber A'.

C is the tongue, and $b$ is a flexible draft-connection, the operation of which will be described hereinafter.

C' is the driver's seat, and $b'$ a rein-hitch.

E represents a platform to receive and retain the grain until removed in gavels by the raker. The platform E rests on a suitable frame, which is supported by a caster-wheel, $h$, on one side and by a small wheel, $h'$, on the other.

Grain-guards E' prevent the cut grain from falling or being dragged off until removed by the raker.

D represents the finger-beam, and which in this case forms a part of the platform-frame. The beam D projects by the end of the main frame A, and is inclined upward, as fully shown in Fig. 2.

To the rear side of the projecting end of beam D is secured an adjusting-plate, $f$, provided with screw-holes $e$, into which fit a set-screw, $d$, for the purpose of adjusting the plate $c$, through which the set-screw $d$ works, whereby the rear end of the yielding draft-connection $b$, which is fastened to the plate $c$, can be set nearer to or farther from the grain-platform, and also nearer to or farther from the ground, so that the draft can be regulated at pleasure.

F is the raker's seat or stand, being partly supported by the beam D and partly by one of the cross-timbers of the platform-frame. The position of the raker's stand F is fully shown in Fig. 1.

To prevent the raker from being thrown or jolted from his stand or seat, a guard, $g$, is secured to the top of a stand, $g'$.

To the under side of the inner end of the platform-frame is attached the rear end of a strong brace or shoe, H, which rises and extends forward, and is hinged at $k$ to a swivel, $k'$, which is secured to the projecting end of the front timber of the main frame, as shown in the drawings.

To give the shoe or brace H the necessary lateral support, a lateral bracing device, H' I I, is employed, the part H' consisting of a strong sheath or tube, which encircles the shoe or brace H, while the parts I I are branches or forks of the sheath H', which extend forward and outward until they reach a point on a line with the hinge $k$, where they are hinged to lugs rigidly secured to the front timber of the main frame, as shown in the drawings, whereby the shoe H is sustained laterally, but is free to rise and fall with the case H', and also to turn in the same. The shoe or brace H might terminate at the top of the sheath or tube H' by having a swiveled head to prevent its slipping out of the tube H', while left free to turn therein.

It will be seen that the platform and cutting apparatus (which latter is to be sustained in front of the bar D in the usual way) can rise and fall, and also either end of the platform and cutting apparatus can rise and fall independently of the other end and of the main frame, and thus the platform and cutting apparatus will be free to conform to the inequalities of the ground over which they are drawn.

When it is desired to raise the outer end of the platform the lever $m$, which is fastened to the case H at its lower end, is thrown toward the standing grain, so as to permit its dog $m'$ to take into ratchet-teeth $l$ on the brace or shoe H, and then the lever is drawn forward, thus raising the outer end of the finger-beam and platform. The dog $m'$ can be raised by cord $m''$.

When it is desired to raise the entire platform the windlass o, which is supported in standards o' o', attached to the main frame, is employed to wind up the chain or rope n, which is attached to the case or sheath H'. The windlass o is provided with a pawl-and-ratchet device by which to hold the rope or chain n from unwinding.

Chains or ropes might be attached directly to the shoe or brace H, if preferred, so as to be operated by the windlass, one rope or chain being wound around the shoe in one direction and the other in a reverse direction, so as to give the shoe a rolling and also a rising motion when raising either end of the finger-bar.

G is the reel, having arms l, to which are attached the cross-pieces 2 and a journal or shaft, j, properly supported in bearings in standards G' G''. The cross-pieces or ribs 2 of the reel G are to be covered with india-rubber 2', Fig. 11, or its equivalent, to enable the reel to draw and hold the grain to the cutting apparatus more effectually, and also to lay it more evenly on the platform after it is cut. The rubber 2' may be applied to the ribs in any convenient manner, so that it covers the surface of the ribs which act on the grain. The inner reel-standard, G', is fastened to a slotted riser, J, rigidly secured to the shoe or brace H. The standard G' is also braced by slotted arms J' J'', the arm J'' being fastened to the shoe H, while the arm J' is fastened to the standard G', as fully shown in Fig. 3. The standard G' could be sustained by a brace attached to the case or sheath H' by having the end of the brace which supported the standard G' slotted out so as to admit the standard G' to pass through it, the slot being of such size and shape as to permit the standard G' to have a free lateral vibration, but no forward and backward motion.

Motion is communicated to the reel from a pulley, 5, on the outside of the wheel B' by means of a cord or band, 4, which drives a pulley, 6, to which is fastened the pulley 7, around which passes the band 8, which runs on the tight pulley 9 on the end of the reel-shaft j. As the axis of motion of pulley 7 is the same as that of the shoe H, or on a line with its hinge k, the band 8 is not affected by the rising and falling of the platform and reel.

M L, Fig. 7, represent a top view of my improved raker's box, and L', Fig. 8, the door through which the raker enters his box L. The door swings on hinges u u, and is provided with a catch, v. Fig. 9 represents a section on line B C, Fig. 7, showing fully the form or shape of the box L. The box L is to be fastened to the top of the stand F, and is to be used as a substitute for the raker's guard g g'.

Some of the more important advantages of my improved raker's box are as follows: The small top fits close to the raker's body, so that he is supported on all sides, while his arms are free to be used in any direction. The wide base allows of the raker's limbs and feet to be placed in a bracing position, whichever way he may be facing, while the inclined outer surface, p, of the bottom of the box affords him additional support for his feet against any sudden tipping of the platform.

Fig. 10 represent's the rein-hitch q as being fastened to a standard, P.

The operation of the rein-hitch is as follows: The standard P, to which the rein-hitch is attached, being fastened to the frame of the machine in any convenient position, the driver springs out the upper part of s, as shown in dotted lines, (it being pivoted at r,) and then inserts the reins, as shown in red lines, when the lower part of s is forced out and the top part back against the reins by the spring t, where they are held until removed by the driver. The use of a rein-hitch on a reaping and mowing machine is a great convenience, since the reins are thus retained in a position where they can be readily grasped by the driver, and also are prevented from getting entangled in the machinery or under the horses' feet when the driver has occasion to leave his seat for any purpose. The rein-hitch might be attached to a spring-post or some similar device, whereby the reins would yield to the forward motion of the horses' heads, but be drawn back as soon as their heads were elevated again.

The gearing and cutting apparatus may be of ordinary construction, and therefore need not be further described, as the ordinary skill of the constructer will be sufficient to properly apply the same.

When the machine is to be used as a reaper the driver is supported on the main frame A, while the reel, cutting apparatus, and raker are supported on the platform-frame. The weight of the frame A rests on the journals of wheels B B', while the weight of the platform-frame rests on the wheels h h', the bearings of which may be made so as to admit of the platform being adjusted to cut the grain at different heights. The team may be hitched to the tongue C of the main frame, so as to draw the platform-frame by the hinge k; or the team may be hitched to the draft-connection b, in which latter case the main frame would be pushed forward by the end of D striking against the rear end of the main frame, in connection with the shoe or brace H being forced against the swivel k' in the front of the main frame. A friction-roller might be attached to the rear of the main frame for the end of D to work against. The raker's stand and the reel are both attached to and move with the frame which supports and carries the cutting apparatus and grain-platform, so that while the cutting apparatus and platform are free to conform to the inequalities of the ground over which they pass the relative position of the raker and reel always remains the same.

When the machine is to be used for a mower the reaping attachment is to be removed and a finger-beam suitable for mowing attached to the shoe H. A short finger-beam could be used, as shown at D, Figs. 5 and 6.

Having described my combined reaper and mower, what I claim, and desire to secure by Letters Patent, is—

1. The combination of the inclined projecting end of the beam D with the rear end of the main frame A and draft-connection b, substantially as set forth.

2. The combination of the shoe or brace H with the sheath or tube H' and hinged forks or arms I I, substantially as set forth.

3. Extending the journal of one of the forks, I, of the sheath or tube H' through its hinge to form the journal of the pulleys 6 and 7, the parts being arranged substantially as set forth.

4. The combination of lever m, with its dog m', with case H' and shoe H, substantially as set forth.

5. Making the upper part of the raker's box in the form of a hollow frustum of a cone and the bottom concave, substantially as shown in Figs. 7, 8, and 9.

6. Covering the surface of the reel-ribs with india-rubber or its equivalent, substantially as and for the purposes set forth.

In witness whereof I have hereunto signed my name.

THOMAS H. DODGE.

Witnesses:
   JOHN QUINCY ADAMS,
   A. C. WIDDICOMBE.